US010587905B2

(12) United States Patent
Ortiz et al.

(10) Patent No.: US 10,587,905 B2
(45) Date of Patent: Mar. 10, 2020

(54) SYSTEMS AND METHODS FOR IMMERSING SPECTATORS IN SPORTING EVENT AND EVALUATING SPECTATOR-PARTICIPANT PERFORMANCE

(71) Applicant: eSports Immersion LLC, Albuquerque, NM (US)

(72) Inventors: Luis M. Ortiz, Albuquerque, NM (US); Kermit D. Lopez, Albuquerque, NM (US)

(73) Assignee: eSports Immersion LLC, Reno, NV (US)

( * ) Notice: Subject to any disclaimer, the term of this patent is extended or adjusted under 35 U.S.C. 154(b) by 0 days.

(21) Appl. No.: 15/834,271

(22) Filed: Dec. 7, 2017

(65) Prior Publication Data

US 2018/0167656 A1    Jun. 14, 2018

Related U.S. Application Data

(60) Provisional application No. 62/430,975, filed on Dec. 7, 2016.

(51) Int. Cl.
*G06F 17/00* (2019.01)
*H04N 21/254* (2011.01)
(Continued)

(52) U.S. Cl.
CPC ......... *H04N 21/254* (2013.01); *A63F 13/355* (2014.09); *A63F 13/46* (2014.09);
(Continued)

(58) Field of Classification Search
None
See application file for complete search history.

(56) References Cited

U.S. PATENT DOCUMENTS 8,370,732 B2   2/2013  Black et al.
8,784,206 B1*  7/2014  Gronkowski ....... G07F 17/3206
                                                       463/32
(Continued)

OTHER PUBLICATIONS

Wagner, M.G., On the Scientific Relevance of eSports, Proceedings of the 2006 International Conference on Internet Computing & Conference on Computer Games Development, Las Vegas, NV, Jun. 26-29, 4 pages.
(Continued)

*Primary Examiner* — Paul A D'Agostino
(74) *Attorney, Agent, or Firm* — Luis M. Ortiz; Kermit D. Lopez; Ortiz & Lopez, PLLC

(57) ABSTRACT

Systems and methods enable sporting event spectators to do more than just observe an online or live contest with the spectators' engagement being limited to group messaging with other spectators (and possibly also the game stars/participants) during an event. The present invention provides a new level of participation for spectators. Spectators can play the game alongside their favorite athlete/star and a computer system evaluates how the participants perform compared to the athlete. The system can monitor several participants and rank their performance against performance of actual athletes to determine which participants made similar moves, took similar actions, or took action that may be deemed superior to action taken by actual athletes. From the collected data top performers can be acknowledge/awarded. The data can also be useful to identify rising stars from the pool of participants, and new athletes worthy of participants in future competitions cane identified.

15 Claims, 6 Drawing Sheets

(51) Int. Cl.
| | |
|---|---|
| *H04N 21/2187* | (2011.01) |
| *H04N 21/81* | (2011.01) |
| *H04N 21/478* | (2011.01) |
| *A63F 13/86* | (2014.01) |
| *G07F 17/32* | (2006.01) |
| *A63F 13/798* | (2014.01) |
| *A63F 13/355* | (2014.01) |
| *H04L 29/06* | (2006.01) |
| *A63F 13/65* | (2014.01) |
| *A63F 13/46* | (2014.01) |

(52) U.S. Cl.
CPC ............ *A63F 13/65* (2014.09); *A63F 13/798* (2014.09); *A63F 13/86* (2014.09); *G07F 17/32* (2013.01); *G07F 17/323* (2013.01); *G07F 17/3218* (2013.01); *G07F 17/3237* (2013.01); *G07F 17/3255* (2013.01); *G07F 17/3269* (2013.01); *G07F 17/3276* (2013.01); *H04L 29/06* (2013.01); *H04N 21/2187* (2013.01); *H04N 21/478* (2013.01); *H04N 21/4781* (2013.01); *H04N 21/8173* (2013.01); *G07F 17/3288* (2013.01); *H04L 67/38* (2013.01)

(56) References Cited

U.S. PATENT DOCUMENTS

| | | | |
|---|---|---|---|
| 8,821,271 B2 | 9/2014 | Davison et al. | |
| 8,856,641 B2 | 10/2014 | Pueyo | |
| 9,196,126 B2 | 11/2015 | Marantelli | |
| 9,275,516 B2 | 3/2016 | Marantelli | |
| 9,474,969 B2 | 10/2016 | Rom et al. | |
| 9,479,602 B1 | 10/2016 | Paradise et al. | |
| 9,630,097 B2 | 4/2017 | Paradise et al. | |
| 9,704,335 B2 | 7/2017 | Frenkel et al. | |
| 9,782,678 B2 | 10/2017 | Long et al. | |
| 9,830,768 B2 | 11/2017 | Frenkel et al. | |
| 9,838,460 B2 | 12/2017 | Perez et al. | |
| 2002/0068633 A1* | 6/2002 | Schlaifer | G06Q 50/34 463/43 |
| 2006/0058103 A1* | 3/2006 | Danieli | A63F 13/12 463/42 |
| 2008/0297997 A1* | 12/2008 | Anderson | A47C 1/12 361/679.02 |
| 2009/0295086 A1* | 12/2009 | Needle | A63F 3/0615 273/277 |
| 2013/0205325 A1* | 8/2013 | Sinha | G06T 1/0021 725/23 |
| 2013/0316837 A1* | 11/2013 | Coiner, Jr. | G07F 17/38 463/43 |
| 2015/0074698 A1 | 3/2015 | Pinto et al. | |
| 2016/0027143 A1 | 1/2016 | Amidei et al. | |
| 2016/0117888 A1 | 4/2016 | Marantelli | |
| 2016/0269788 A1 | 9/2016 | Jones | |
| 2017/0001111 A1 | 1/2017 | Willette et al. | |
| 2017/0001112 A1 | 1/2017 | Gilmore et al. | |
| 2017/0001122 A1 | 1/2017 | Leung et al. | |
| 2017/0003740 A1 | 1/2017 | Verfaillie et al. | |
| 2017/0003784 A1 | 1/2017 | Garg et al. | |
| 2017/0006074 A1 | 1/2017 | Oates, III | |
| 2017/0006322 A1* | 1/2017 | Dury | H04N 21/254 |

OTHER PUBLICATIONS

Grove, C. et al., Casinos & eSports Investigating Industry Attitudes, Narus, Eilers & Krejcik Gaming, 2016, 12 pages.
Grove, C., A Casino's Guide to eSports Opportunities, Narus, 2016, 12 pages.
esports whitepaper, Ukie, The Association for UK Interactive Entertainment, Growing the UK as an esports hub, ukie, org.uk, 20 pages.
Grove, C., eSports & Gambling: Where's the Action?, Narus, Version 2, Aug. 15, 2016, 31 pages.
Lowenstein, D. et al., Gamblit Gambling Line-Up, Gamblit Gaming, LLC, 7 pages.
Deloitte. eSports: bigger and smaller than you think (2016) Deloitte Touche Tohmatsu Limited, 3 pages.
The Golden Age of eSports, Intel News Fact Sheet, 2 pages.
IfrahLaw, The Definitive Guide to iGaming in the United States, Updated for Fall 2016, 54 pages.
Anekal, M., What is eSports for Brands, Fall 2016, 15 pages.
Souza, E., The eSports Industry to Date, The Drivers Behind Current and Future Growth, NewZoo Games Market Research, eSports Conference, San Francisco, Sep. 9, 2015, 32 pages.
Rippee, R., eSports Lab, UNLV, International Gaming Institute, 10 pages.
Grove, C., Understanding Skin Gambling, Narus (2016) 9 pages.
Green, W., Skins in the Game: The Size of esports skin belting in 2016, its convoluted closure, and how it could shape the future of esports wagering, Narus, eSports Betting Report (2016) 19 pages.
Halaby, C., Spotlight on eSports, An Exploration of the Growing eSports Landscape and its Implications for Marketers, Aug. 2016, www.mecglobal.com, 14 pages.
Twitch.tv—Wikipedia, printed Oct. 26, 2016, 9 pages.
Buckley, S., Microsoft built Twitch-like livestreaming into Windows 10, printed Oct. 26, 2016, 9 pages.

* cited by examiner

SYSTEMS AND METHODS FOR IMMERSING SPECTATORS IN SPORTING EVENT AND EVALUATING SPECTATOR-PARTICIPANT PERFORMANCE

CROSS-REFERENCE TO PROVISIONAL PATENT APPLICATION

This non-provisional patent application claims the benefit under 35 U.S.C. § 119(e) of and priority to U.S. Provisional Patent Application Ser. No. 62/430,975, filed on Dec. 7, 2016, entitled "Systems and Methods for Immersing Spectators in Sporting Events and Evaluating Spectator-Participant Performance," which is hereby incorporated by reference in its entirety.

TECHNICAL FIELD

Embodiments are generally related to sporting events including live events and video games including multiplayer video gaming. More particularly, the embodiments relate to systems and methods for immersing spectators into live sporting events including multiplayer video gaming competitions such as eSports, and also for means of evaluating spectator-participant performance.

BACKGROUND

Competitive sporting competitions have taken on new forms given the advent of high-speed computer networks and devices. No longer are sporting events in large venues with sellout crowds the domain of baseball, football, basketball, or soccer. Promoters and sponsor of sporting events must also include competitive computer gaming to the mix.

The term eSports (electronic sports) relates to a form of competition that is facilitated by electronic systems, particularly video games. The term eSports is also known or referred to as, esports, e-sports, competitive (video) gaming, professional (video) gaming, or pro gaming). With eSports, the input of players and teams as well as the output of the eSports system are mediated by human-computer interfaces. Most commonly, eSports take the form of organized, multiplayer video game competitions, particularly between professional players. The most common video game genres associated with eSports are multiplayer online battle arena (MOBA), real-time strategy, fighting, and first-person shooter (FPS). Tournaments, such as the League of Legends World Championship, The International, the Bettle.net World Championship Series, the Evolution Championship Series, the Intel Extreme Masters, and the Smite Word Championships provide live broadcasts of the competition, prize money, and salaries to competitors. Top players can even receive endorsement deals/contracts from third parties wanting to promote their products and services.

Although organized online and offline competitions have long been a part of video game culture, participation and spectatorship of such events have seen a large surge in popularity from the late 2000s and early 2010s. While competitions around 2000 were largely between amateurs, the proliferation of professional competitions and growing viewership now supports a significant number of professional players and teams, and many video game developers now build features into their games designed to facilitate such competition. Casinos are realizing the potential in eSports and are evaluating how eSports can be implemented in their gambling enterprises in a manner that can generate gaming revenue as well as attract eSports events and spectators to casino venues.

As of the filing date of this patent document, the most successful titles featured in professional competition have been the multiplayer online battle arena (MOBA) games Dota 2, and League of Legends, and the first person shooter game Counter-Strike: Global Offensive. Other games with significant distribution and sales include Smite, StarCraft II, Call of Duty, Heroes of the Storm, Hearthstone, and Overwatch.

Tens of millions people (and fast approaching hundreds of millions) worldwide watch eSports. The increasing availability of online streaming media platforms, particularly Twitch.tv. Twitch.tv has become central to the growth and promotion of eSports competitions.

It is a live streaming video platform owned by Twitch Interactive, a subsidiary of Amazon.com, Inc. The site primarily focuses on video gaming, including playthrough of video games, broadcasts of eSports competitions, creative content, and more recently, music broadcasts.

Demographically, Major League Gaming has reported viewership that has a greater male than female viewership, with most of viewers between the ages of 18 and 34. Despite this, several female personalities within eSports are hopeful about the increasing presence of female gamers. South Korea has several established eSports organizations, which have licensed pro gamers since the year 2000. Recognition of eSports competitions outside South Korea has come somewhat slower. Along with South Korea, most competitions take place in Europe, North America, and China. Despite its large video game market, eSports in Japan is relatively underdeveloped, which has been attributed largely to its broad anti-gambling laws.

Given the fast growth, global expansion and economic impact of eSports, what is needed are new systems and methods that enable spectators to also enjoy and engage in eSports, and for business (such a casinos) to capture revenue at a time when aging citizenry that currently patronize traditional gaming venues and casinos is being replaced by a demographic of younger customers that desire entertainment more to their liking, such as computer gaming.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is a feature of the embodiments to enable sporting event (i.e., eSports) spectators to do more than just observe an online or live contest with the spectators' engagement being limited to group messaging with other spectators (and possibly also the game stars/participants) during an event. Furthermore, the disclosed embodiments can provide a new level of participation for spectators. Spectators can play the game alongside their favorite athlete/star and a computer system evaluates how the participants perform compared to the athlete. The disclosed system can monitor several participants and rank their performance against performance of actual athletes to determine which participants made similar moves, took similar actions, or took action that may be deemed superior to action taken by actual athletes. From the collected data (e.g., at the end of an event) top performers can be acknowledge/awarded (e.g., 1st, 2nd, and 3rd place). The data can also be useful to identify rising stars from the pool of participants, and new athletes worthy of participants in future competitions cane identified.

The service described herein can also serve as a talent finder for eSports and eGaming events. It can also provide another form of revenue because spectators wishing to participate in gaming alongside a selected athlete during an event can pay for such access. Where gambling is allowed, other participants cannot only bet on the headliner gamers/ athletes, but can also side bet on the spectator participants.

Accordingly, it is a feature of the disclosed embodiments to provide a method for electronically facilitating the immersion of spectators in a live event. The disclosed method includes a step or operation of storing data associated with the live event in at least one server configured for managing eSports events/data and associated with a live event. The data can include digital video associated with the live event and data indicative of plays associated with at least one athlete of the live event. Another step can involve storing a second set of data in the server that is associated with and electronically provided by action of at least one spectator using a client device (e.g., a mobile handheld device such as a smartphone, tablet computer, or portable gaming apparatus such as the Nintendo NX) at the live event Client devices can also include AR/VR headgear used in association with a portable computer. Anticipated plays can be monitored by a spectator, and anticipated plays can be provided by the spectator through the client device. Anticipated plays can be collected from the spectator via the second set of data and matched with an actual play the athlete after collecting the anticipated plays. Actual plays contained within the first set of data, and the matching results in a correlation of the anticipated plays with respect to actual plays by the at least one athlete to render data indicative of performance rankings with respect to the at least one spectator.

It is another feature of the embodiments that a system provides image-processing of digital video so as to transform the digital video associated with a live event into a digital format suitable for display of the digital video in a first display area of a graphical user interface of a client device used by spectators or participants (other than athletes) of an electronic sporting event. Additionally, the data associated with a spectator-participant can be simultaneously displayed in a second display area of a graphical user interface of the client device.

It is yet another feature of the disclosed embodiments that performance rankings are evaluated and can be utilized to determine at least one of: a prize allocation to at least one top performer selected from a pool of spectator-participants; and establishment of a talent pool of spectator-participants for use by recruiters of future professional competitions.

It is another feature of the embodiments that at least one spectator-participant is also a spectator of the live event when receiving data at at least one spectator-participant client device and is a spectator-participant in the live event when providing data in the form of anticipated action via a spectator-participant client device to a server associated with the live event, and more than one spectator also receives the data at client devices associated with each of the more than one spectator.

It is another feature of the embodiments that performance rankings are utilized to determine at least one of: a prize allocation to at least one top performer selected from a pool of spectator-participants; and establishment of a talent pool of spectator-participants for use by recruiters of future professional competitions.

It is another feature of the embodiments wherein client devices interacting with the system can be provided in the form of a VR (Virtual Reality) device and the digital streaming is enhanced for VR rendering via the VR device.

It is another feature of the embodiments to permit spectators to wager on an outcome of the matching through the graphical user interface.

It is another feature of the embodiments to permit the at least one spectator to wager on at least one of an outcome of the matching, spectator-participant performance with respect to athletes, and/or an outcome of the eSports event through the graphical user interface.

BRIEF DESCRIPTION OF THE DRAWINGS

The accompanying figures, in which like reference numerals can refer to identical or functionally similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

Figure 1:
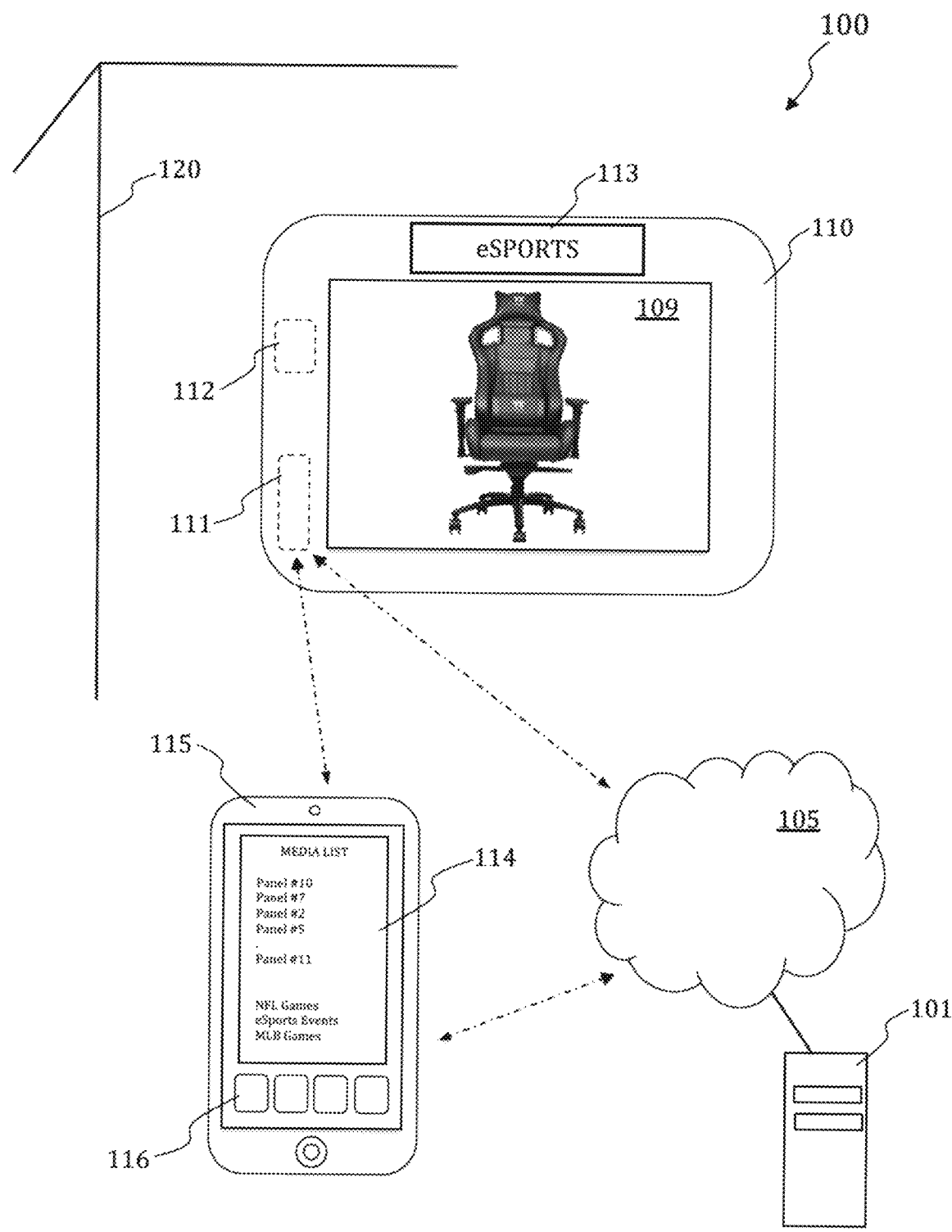
FIG. 1 illustrates a system enabling spectators and spectator-participants to immerse in a live sporting event being broadcast/streamed over flat panel displays screens streaming a live event, and with the support of a data network and while in communication with a server, in accordance with an example embodiment.

Subject matter will now be described more fully hereinafter with reference to the accompanying drawings, which form a part hereof, and which show, by way of illustration, specific example embodiments. Subject matter can, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter can be embodied as methods, devices, components, or systems. Accordingly, embodiments can, for example, take the form of hardware, software, firmware or any combination thereof (other than software per se). The following detailed description is, therefore, not intended to be taken in a limiting sense.

Throughout the specification and claims, terms can have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology can be understood, at least in part, from usage in context. For example, terms such as "and," "or," or "and/or" as used herein can include a variety of meanings that can depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, can be used to describe any feature, structure, or characteristic in a singular sense or can be used to describe combinations of features, structures, or characteristics in a plural sense. Similarly, terms such as "a," "an," or "the," again, can be understood to convey a singular usage or to convey a plural usage, depending at least in part upon context. In addition, the term "based on" can be understood as not necessarily intended to convey an exclusive set of factors and can, instead, allow for existence of additional factors not necessarily expressly described, again, depending at least in part on context.

In the following detailed description, numerous specific details are set forth in order to provide a thorough understanding of some embodiments. However, it can be understood by persons of ordinary skill in the art that some embodiments can be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing," "analyzing," "checking," or the like, can refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that can store instructions to perform operations and/or processes.

The terms "plurality" and "a plurality," as used herein, include, for example, "multiple" or "two or more." For example, "a plurality of items" includes two or more items.

References to "one embodiment," "an example embodiment," "an embodiment," "demonstrative embodiment," "various embodiments," etc., indicate that the embodiment(s) so described can include a particular feature, structure, or characteristic, but not every embodiment necessarily includes the particular feature, structure, or characteristic. Further, repeated use of the phrase "in one embodiment" does not necessarily refer to the same embodiment, although it can.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments can be used in conjunction with various devices and systems, for example, a Personal Computer (PC), a desktop computer, a mobile computer, a laptop computer, a notebook computer, a tablet computer, a Smartphone device, a smartwatch, wearable computing devices, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AN) device, a wired or wireless network, a cellular network, a cellular node, a Multiple Input Multiple Output (MMO) transceiver or device, a Single input Multiple Output (SMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Note that the term "server" as utilized herein refers generally to a computer that provides data to other computers. Such a server can serve data to systems on, for example, a LAN (Local Area Network) or a wide area network (WAN) over the Internet. Many types of servers exist, including web servers, mail servers, and files servers. Each type can run software specific to the purpose of the server. For example, a Web server can run Apache HTTP Server or Microsoft IS, which both provide access to websites over the Internet. A mail server can run a program such as, for example, Exim or iMail, which can provide SMPT services for sending and receiving email. A file server might utilize, for example, Samba or the operating system's built-in file sharing services to share files over a network. A server is thus a computer or device on a network that manages resources. Other examples of servers include print servers, database servers and so on. A server can be dedicated, meaning that it performs no other tasks besides their server tasks. On multiprocessing operating systems, however, a single computer can execute several programs at once. A server in this case can refer to the program that is managing resources rather than the entire computer.

Some embodiments can be used in conjunction with devices and/or networks operating in accordance with existing Long Term Evolution (LTE) specifications, e.g., "3GPP TS 36.304 3rd Generation Partnership Project; Technical Specification Group Radio Access Network; Evolved Universal Terrestrial Radio Access (E-UTRA); User Equipment (UE) procedures in idle mode"; "3GPP TS 36.331 3rd Generation Partnership Project; Technical Specification Group Radio Access Network; Evolved Universal Terrestrial Radio Access (E-UTRA); Radio Resource Control (RRC); Protocol specification"; "3GPP 24.312 3rd Generation Partnership Project; Technical Specification Group Core Network and Terminals; Access Network Discovery and Selection Function (ANDSF) Management Object (MO)"; and/or future versions and/or derivatives thereof, units and/or devices which are part of the above networks, and the like.

Some embodiments can be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wireless Fidelity (Wi-Fi), Wi-Max, ZigBee®, Ultra-Wideband (UWB), Global System for Mobile communication (GSM), second generation (2G), 2.5G, 3G, 3.5G, 4G, 5G, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1.times.RTT), Evolution-Data Optimized (EV-DO), Enhanced Data rates for GSM Evolution (EDGE), and the like. Other embodiments can be used in various other devices, systems and/or networks.

The phrase "hand held device" and/or "wireless device" and/or "mobile device", as used herein, includes, for example, a device capable of wireless communication, a communication device capable of wireless communication, a communication station capable of wireless communication, a portable or non-portable device capable of wireless communication, or the like. In some demonstrative embodiments, a wireless device can be or can include a peripheral that is integrated with a computer, or a peripheral that is attached to a computer. In some demonstrative embodiments, the phrase "wireless device" and/or "mobile device" can optionally include a wireless service and can also refer to wearable computing devices such as smart watches, eyeglass computing devices (e.g., Google Glass, etc.) and AR/VR goggles.

A "hand held device" or HHD is a type of mobile device or wireless device, which can be held in one's hand during use, such as a smart phone, personal digital assistant (PDA), tablet computing device, laptop computer, portable gaming apparatus, and the like. Non-HHD computing systems such as a head mounted display (e.g., virtual reality goggles/head gear) can be utilized in place of an HHD in some instances and can be configured to receive wirelessly streaming data such as video, audio, etc. such as discussed herein. It can be appreciated that such devices are not hand held devices and do not constitute an HHD since they are not used as "hand held devices" but as other types of computing devices, such as wearable computing devices. The example embodiments herein primarily describe methods and systems involving hand held devices. It can be appreciated, however, that other mobile devices such as wearable computing devices can be utilized in place of a hand held device (wearable devices are not "hand held devices" because are intended to be used in a user's hands but instead worn by the user) or can be utilized with other hand held devices. For example, venue-based data as discussed herein can be streamed not only to hand held devices but also to other mobile computing devices such as wearable computing devices. Note that as utilized herein, the term venue-based data can refer to multimedia data including video and/or audio and can also include other advertising, sports and/or entertainment information.

The term "communicating" as used herein with respect to a wireless communication signal includes transmitting the wireless communication signal and/or receiving the wireless communication signal. For example, a wireless communication unit, which is capable of communicating a wireless communication signal, can include a wireless transmitter to transmit the wireless communication signal to at least one other wireless communication unit, and/or a wireless communication receiver to receive the wireless communication signal from at least one other wireless communication unit.

Some demonstrative embodiments are described herein with respect to a LTE cellular system. However, other embodiments can be implemented in any other suitable cellular network, e.g., a 3G cellular network, a 4G cellular network, a 5G cellular network, a WiMax cellular network, and the like.

The term "antenna," as used herein, can include any suitable configuration, structure and/or arrangement of one or more antenna elements, components, units, assemblies and/or arrays. In some embodiments, the antenna can implement transmit and receive functionalities using separate transmit and receive antenna elements. In some embodiments, the antenna can implement transmit and receive functionalities using common and/or integrated transmit/receive elements. The antenna can include, for example, a phased array antenna, a single element antenna, a dipole antenna, a set of switched beam antennas, and/or the like.

The terms "cell" or "cellular" as used herein, can include a combination of network resources, for example, downlink and optionally uplink resources. The resources can be controlled and/or allocated, for example, by a cellular node (also referred to as a "base station"), or the like. The linking between a carrier frequency of the downlink resources and a carrier frequency of the uplink resources can be indicated, for example, in system information transmitted on the downlink resources.

Note that the term venue as utilized herein can refer to venues such as, for example, sports stadiums, sports arenas, entertainment venues, movie theaters, concert arenas, convention centers, political conventions, casinos, fairgrounds, amusement parts, theme parks (e.g., Disneyland, Disneyworld, Universal Studios, etc.) open spaces subject to an event, and so on. An example of a venue is not only a professional sports arena/stadium such as a baseball park or a football stadium or a basketball or hockey arena, but also venues such as locations where, for example, high school graduation ceremonies or other events take place. Events can occur over a vast area of land (e.g., winter and summer Olympics, motocross, Tour de France), and therefore a venue can necessarily expand to include the land or area covered by and/or associated with the event. An amusement or theme park is also an example of a venue. The term venue as utilized herein can refer not only to a place (e.g., the stadium or racing arena), but also to an event itself.

Thus, an eSports event and/or the place where the eSports event is taking place can be a venue. Note that the term eSports (also known as electronic sports, esports, e-sports, competitive (video) gaming, professional (video) gaming, or pro-gaming) can be defined as a form of sports where the primary aspects of the sport are facilitated by electronic systems; the input of players and teams as well as the output of the eSports system are mediated by human-computer interfaces.

Most commonly eSports can take the form of organized multiplayer video game competitions, particularly between professional players. The most common video game genres associated with eSports are, for example, real-time strategy, fighting, first-person shooter (FPS) and multiplayer online battle arena (MOBA). Tournaments such as The International the League of Legends World Championship, the Battle.net World Championship Series, the Evolution Championship Series and the Intel Extreme Masters, provide both live broadcasts of the competition, and prize money and salaries to competitors.

Note that the term "spectator" generally refers to a person engaged in watching a live event, either in person at a live venue or over a multimedia system. A spectator can also engage with data from remote services (servers) associated with the live programming to obtain additional information, and an also be authored to place wagers on live events where online gambling is authorized. A "spectator-participant" as used herein refers to someone that is more than a spectator because they are engaged in competitive action with respect to the live event. "Co-play" or "co-playing" as referred to herein refers to a spectator-participant's ability to engage in gaming alongside professional gaming athletes that are competing in live events (e.g., eSports team members engaged in battle via computers gaming systems). Co-play as described herein and enabled by the embodiments can allow a spectator-participants to play the very same game that is being featured live while shadowing a particular athlete, and the spectator-participant's performance can be evaluated (e.g., compared or matched) against the athlete's performance. As will be further derived herein, data (e.g., statistics) that result from the competition can be of value to many parties.

FIG. 1 illustrates a system 100 enabling spectators and spectator-participants to immerse in a live sporting event being broadcast/streamed over flat panel displays screens 110 streaming a live event 109, and with the support of a data network 105 and while in communication with a server 101. System 100 can enable flat panel, or associated and supporting multimedia hardware module, discovery and access to data associated with programming (e.g., a live video broadcast) displayed on a flat panel 110 selected by a handheld device 115. A flat panel 110 can have access to a data network 105 to retrieve programming and information regarding a live event, athletes, and spectator-participants engaging in co-playing activity with the live event from a remote server 101, either directly or via connectable devices 109 like Apple TV, Roku, popular gaming systems and set top boxes. The flat panel 110 can also have an internal (built-in) wireless communication module 111 (e.g., WiFi or Bluetooth, or both) to support communications with nearby handheld devices 115 or to obtain further data access from the network 105 in the same manner as a connected device like Apple TV, PS2, WII, or other gaming or media devices would through application software. The flat panel device can include a memory 112 that can function as a queue to store programming displayed on a display screen (e.g., LCD, LED, Plasma, or the like) integrated in the flat panel, and which can include a limited amount of past programming previously displayed on the display screen 109 integrated in the flat panel. The wireless communication module can wirelessly broadcast identifying information 113 for the flat panel 110 to nearby handheld devices 115. The identifying information 113 can be any of an identification number (screen labeled #10, as shown) physically located on or near a flat panel 110 that can be read by spectators, or electronic information broadcasted about the physical location of the flat panel 110 in a venue 120, or broadcasted information about programming being displayed on the flat panel 110. The broadcast of wireless-enabled device identities is common for WiFi hotspots and Bluetooth connected devices, where identifying information is periodically sent for receipt by devices in search of a wireless data connection; however, flat panel television sets do not currently broadcast identifying information (in particular, after-market labels, or physical location information), and information broadcasted from other devices today are not used for purposes of obtaining data associated with programming displayed on flat panel displays where numerous other flat panel displays may also be co-located (located next to each other) in a crowded venue (e.g., a sports bar, casino or sports stadium).

Flat panels 110 enabled with a wireless communication module 111 and memory 112 can be programmed using an application to broadcast identifying information rather than just the manufacturer and model information. Manufacturer and model information would be useless if broadcasted from, for example, ten flat panel devices in a sports bar that are made by the same manufacturer and are the same model. This is why the use of unique identifying information is necessary in accordance with some features of the present invention. Information will be described in further detail below, but can include physical location, programming information, or a name/label physically attached to the flat panel to assist users in identification of the desired flat panel to interact with.

The handheld device 115 can be provided in the form of a smartphone (e.g., iPhone, Android-based smartphone) or tablet and include an application 116 that enables the discovery of available flat panels 110 near the handheld device 115 or identification of video programming being displayed on a selected flat panel. Discovery can be accomplished by receiving identifying information 113 for the flat panel in a list of available devices 114, or for the programming being rendered on the flat panel 100. The flat panel 110 can be selected on the handheld device 115, and the handheld device 115 can then begin receiving data associated with programming displayed at the flat panel 110. The handheld device 115 can also interact with programming displayed at the flat panel 110 via the application 116.

Figure 2:
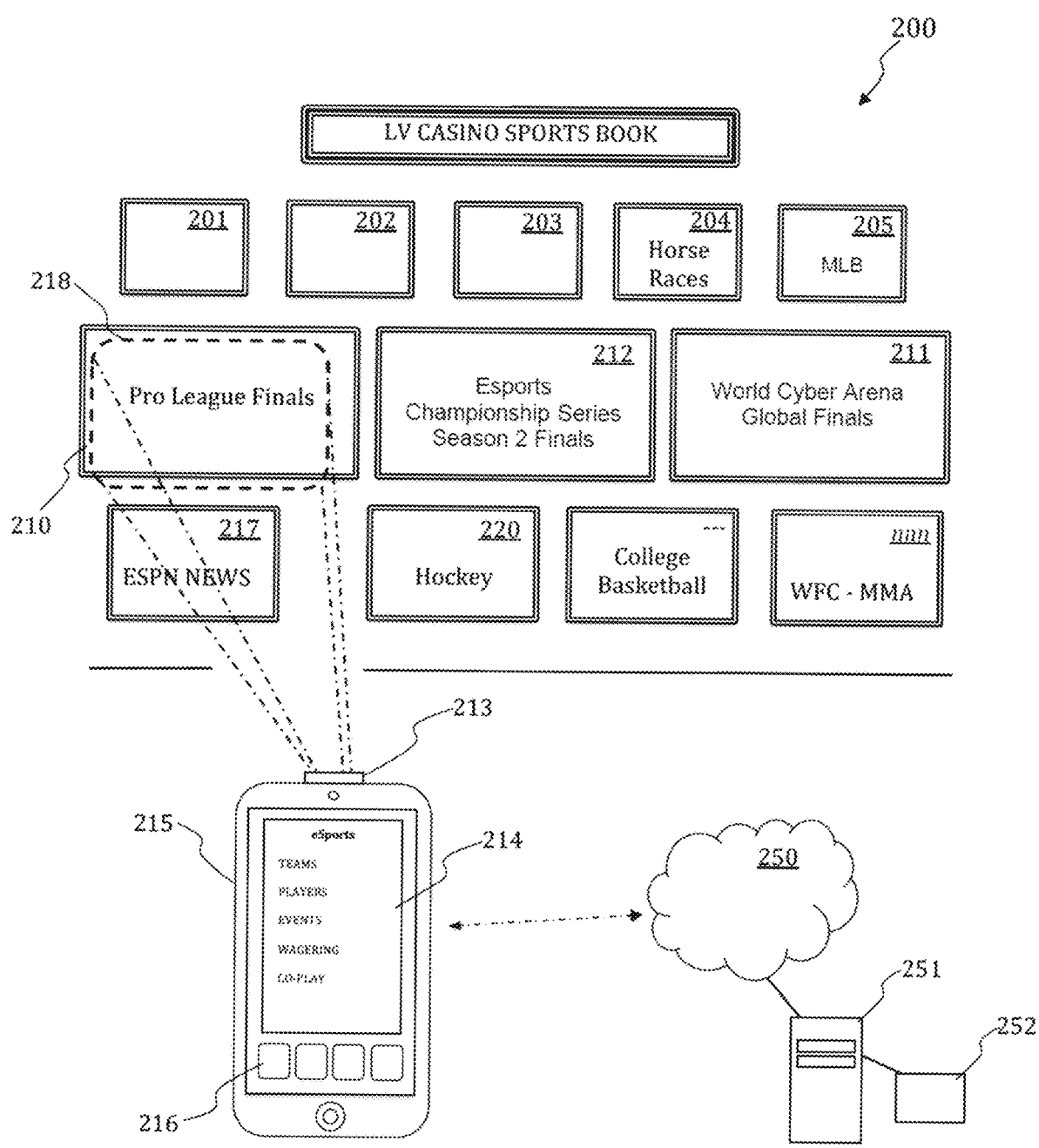
FIG. 2 illustrates a system enabling selection of video programming from a select flat panel display in a venue where many screens and programs are being rendered (e.g., casino sports book), the determination of a match with programming and the availability of related data, and enabling access to data associated with programming displayed on a particular flat panel selected by a handheld device, even when several flat panel devices are also located near the handheld device (HHD), in accordance with an example embodiment.

FIG. 2 illustrates a system 200 enabling selection of live video programming to interact with from a select flat panel display 218 in a venue where many screens and programs are being utilized to render live sports programming (e.g., casino sports book). The system can enable the determination of a match with programming and the availability of related data, and enabling access to data associated with programming displayed on a particular flat panel selected by a handheld device, even when several flat panel devices are also located near the handheld device. The system 200 can enable handheld device 215 access to data related to the video programming from a remote server 251 based on the identification of video programming rendering on the selected flat panel 210.

According to an alternative embodiment, an image of the video programming (e.g., image of a live MLB Baseball Game) can be captured by a camera 213 integrated in the handheld device 215. The image can then be transferred to a remote server 251 accessible by the handheld device 215 over a data network 250 (e.g., via WIFI or cellular data) wherein the captured image can be compared to images of video programming, which can be stored in a database 252 associated with or accessible by the remote server 251. If the image matches the images of video programming stored in the database 252, a notification message and/or indication of the availability of data associated with the video programming captured by the handheld device 215 from the selected flat panel 210 is sent to the handheld device 215. The handheld device 215 can capture the image from the selected flat panel 210 with the handheld device 215 despite the availability of several additional flat panel devices 201, 202, 212, and 217, in close proximity to selected flat panel 210 because only the image from the selected flat panel 210 is what is used for comparison at the server and for an indication of video programming-related data availability.

As shown on the display screen 214 of handheld device 215, the programming can be identified (e.g., "eSports") once a match is determined.

Once the mobile device 215 is engaged in a reviewing or participating in a selected program (e.g., "Pro League Finals"), a user of the mobile device can obtain information over a data network 250 form a remote server 251. Other live events available for access and interaction are shown in FIG. 2, such as Esports Championship Series Season 2 Finals 212, World Cyber Arena Global Finals 211, MLB baseball games 205, horse races 204, etc. Information can include items such as those listed in the screen 214 of the mobile device 215, such as "Teams", "Players", "Events", "Wagering" and "Co-play". Data regarding teams, players and events can be obtained from a database 252 associated with the server 251 (or another database/server (not shown) storing associated information). With respect to wagering, the mobile device can facilitate gambling by a user based on the live sporting event being monitored. Available data can include video, replays, statistics, advertisement, etc., that can be also shown on the display screen 214. The data can be managed with the touchscreen user interface of the handheld device 215, which is typically feature of modern smartphones and tablet computers together with wireless data network access and an integrated camera. It should be appreciated now that a user of the handheld device can choose to capture an image from another flat panel device (e.g., flat panel 211, "NFL Football Game") if the user desires access to new data related to a different video program.

Once live sports programming information of interest is identified (i.e., the same football game, regardless of the flat panel used to identify it), the handheld device 215 can selectively retrieve programming related data from either the selected flat panel or a remote server 251 via a wireless data network given the teaching provided herein.

Figure 3:
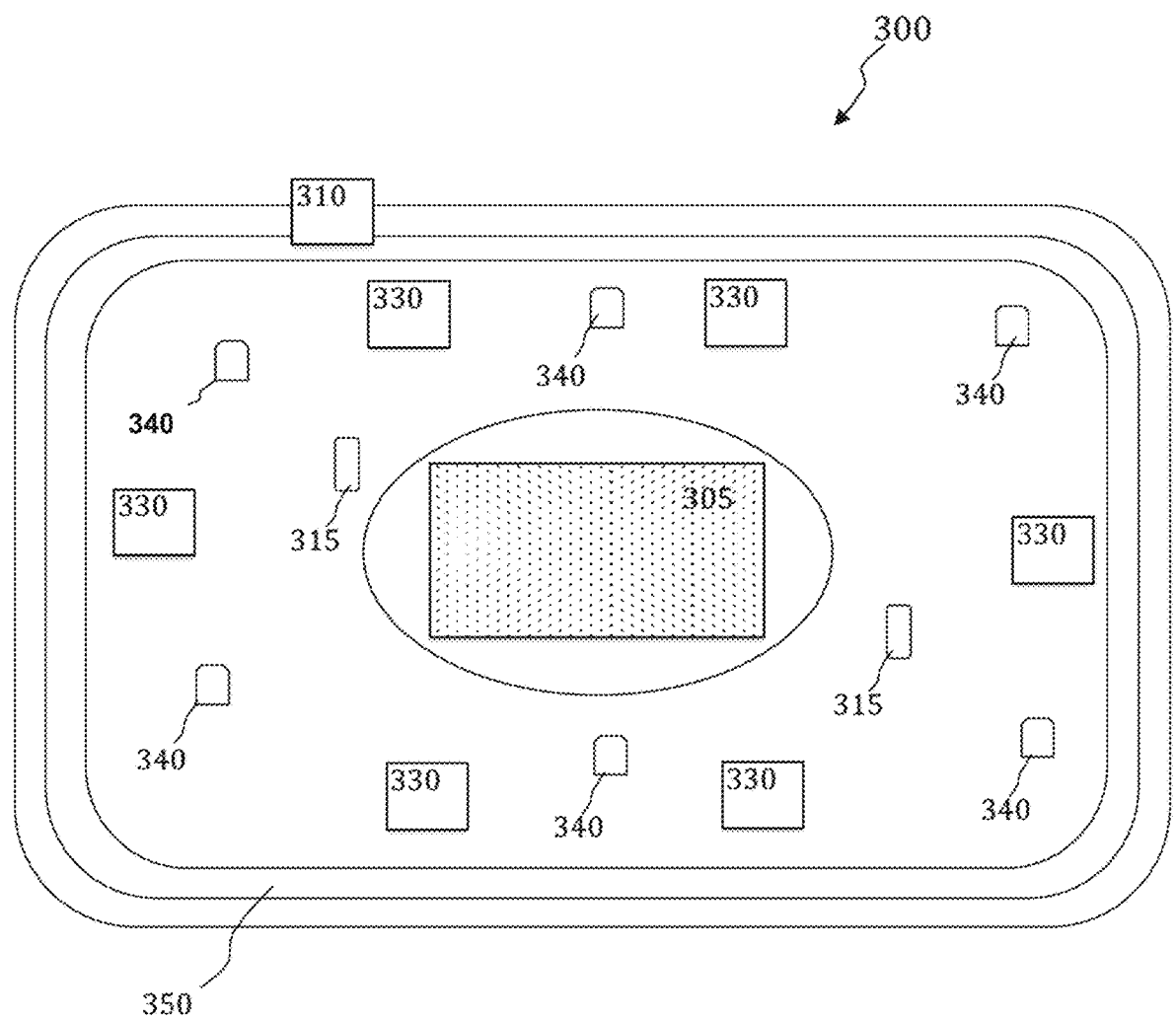
FIG. 3 illustrates a system deployed in a large venue such as a sports stadium that utilizes wireless infrastructure at the venue to broadcast available data associated with the sporting event, and aspects of the sporting event can also be streamed/displayed on flat panel displays that can be located throughout the large venue and can also enable access to the data associated with the sporting event taking place at the venue, in accordance with an example embodiment.

FIG. 3 illustrates a system 300 deployed in a large venue 350 such as a sports stadium that utilizes wireless infrastructure including hotspots 340 at the venue to broadcast available data associated with programming being displayed on flat panel displays 330 located throughout common areas of the large venue to handheld devices 315 also located at the venue 350, and can also enable access to the data associated with live programming displayed on a particular flat panel 310 (e.g., flat panels deployed in a private suite location) selected by handheld devices 315, and the selection can be accomplished when several flat panel devices are also located near the handheld device in accordance with features of the present invention. Wireless infrastructure can include hotspots deployed throughout the large venue.

U.S. Pat. No. 8,320,820 issued to Ortiz, co-inventor of the present invention, entitled "Self-contained data communication system nodes as stand-alone pods or embedded in concrete walkways and in walls at public venues including sports and entertainment venues," describes hotspots deployed in a sports venue to enable handheld device access to venue-related data. Note that U.S. Pat. No. 8,320,820 is incorporated herein by reference in its entirety. U.S. Pat. No. 8,320,820, which can be utilized to implement certain novel features of the present invention, is hereby incorporated by reference in its entirety for its teaching. The hotspot pods described by Ortiz can be adapted with media and gaming capabilities as described herein to provide handheld devices users with a list of data related to programming being displayed on flat panels in the venue that is available for retrieval by the handheld devices, or the availability of interaction with the programming that is being displayed. With the present invention, the skilled can imagine a multi-participant interactive session (e.g., gaming, social networking) that is directly associated with live programming (e.g., eSports events) being displayed on flat panels located at the venue.

In accordance with features of the present invention, a system deployed in a sports stadium 350 can enable sports fans using smartphones 315 to recognize and interact with media being displayed at the venue to retrieve instant replays, statistics, and other data based on programming being viewed on numerous flat panel displays 330 typically located within such a venue 350. The system can also support interaction by spectators that want to engage as participants in the sporting event as spectator-participants. A football fan, for example, can re-watch an instant replay for a programming he just viewed on a flat panel display 310 located near his seat, a baseball fan can review additional facts statistics for an athlete shown on a flat panel 310 that is currently at bat. The invention benefits all sports (basketball, soccer, ice hockey, tennis) so long as flat panel displays 330 exist in the venue and are displaying active programming to attendees. Live programming information can also be used by the handheld device 315 to retrieve additional information from a remote server as previously described.

Figure 4:
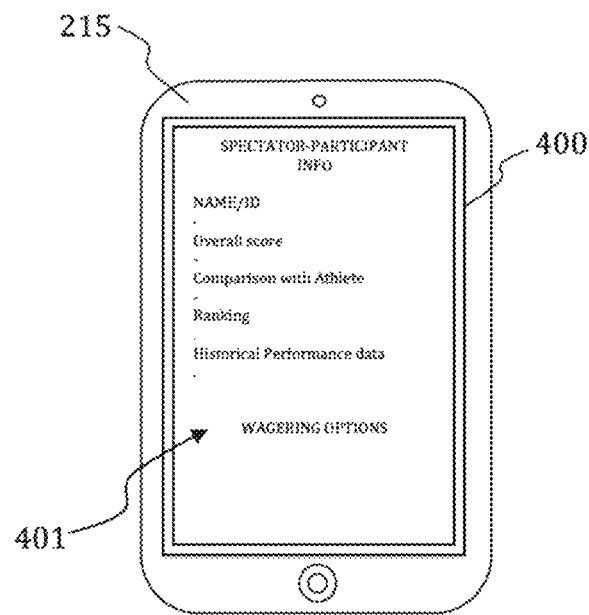
FIG. 4 illustrates a screen shot from a handheld device illustrating data regarding a spectator-participant's information including identity, scores, statistics, ranking, etc., in accordance with an example embodiment.

FIG. 4 illustrates a screen shot 400 from a handheld device 215 illustrating a menu-like list 401 of information that can be obtained from a server 251 in associated with a spectator-participant. Information can include: Name/ID, Overall Score, Comparison with Athlete, ranking, historical performance data (i.e., statistics), and can also offer wagering options. A "spectator" is a regular fan of a sporting event that is amused by viewing streaming information (e.g., video, statistics) regarding a live event that is being watched (either in person or live at a venue). A "spectator-participant," however, is a person engaged in co-playing along with athletes engaged in a live event, such as a eSports completion. The Spectator-participant's activities/capabilities can be measured and matched against a professional athlete, and then data revealing the spectator-participant's performance can be recorded, matched against the athlete's performance and then evaluated, resulting in statistics for the spectator-participant. The statistics can be used by mere spectators to wager on the performance of spectator-participants. The statistics can also be used to recruit/draft high performing spectator-participants for professional competitions if their performance proves worthy. Data on numerous spectator-participants can be pooled, thereby creating a talent pool for recruiting/drafting new talent for eSports competitions and teams. Incentives, such as awards, prizes, recognition, can be provided to spectator-participants. Revenue can be raised from spectator-participants wanting to be engaged in co-play against pro athletes in a manner that is tracked and rewarded (either with cash, prizes, or potential recruitment).

In accordance with features of the present invention, a system deployed in a sports stadium can enable sports fans using smartphones to interact with media being displayed at the venue to retrieve instant replays, statistics, and other data based on programming being viewed on numerous flat panel displays typically located within such a venue. A football fan, for example, can re-watch an instant replay for a programming he just viewed on a flat panel display located near his seat, a baseball fan can review additional facts statistics for an athlete shown on a flat panel that is currently at bat. The invention benefits all sports (e.g., eSports, football, basketball, soccer, ice hockey, tennis, baseball, etc.) so long as flat panel displays exist in the venue with the present invention capabilities and are displaying active programming to attendees. Programming information can be used by the handheld device to retrieve additional information from a remote server as previously described.

Figure 5:
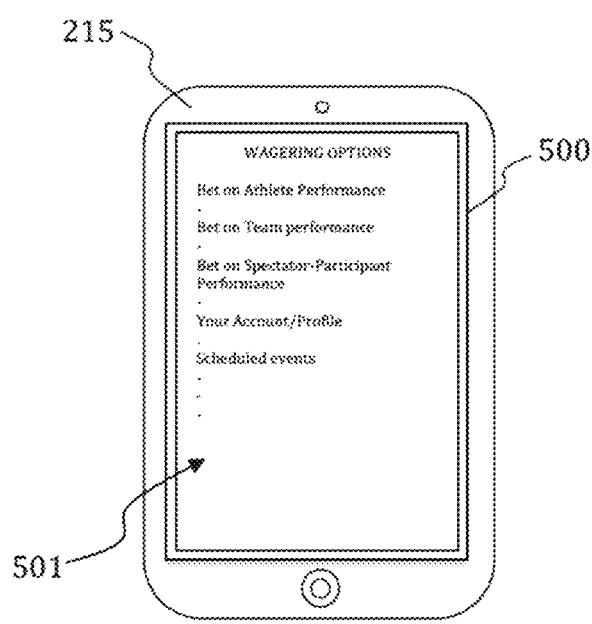
FIG. 5 illustrates a screen shot from a handheld device illustrating a list of wagering options regarding a live sporting event that can be selected in coordination with a remote server.

Referring to FIG. 5, a menu 501 displayed on a display 500 of a client device such as the handheld device 215 can provide Wagering Options for users. A spectator of a live sporting event can access wagering options and bet on athlete performance, team performance, and spectator-participant performance. A spectator and user of the handheld device 215 can also access their accounts/profiles and information regarding scheduled events. Users can set up a wagering account to support the wagering on a live sporting event, such as an eSports competition.

Figure 6:
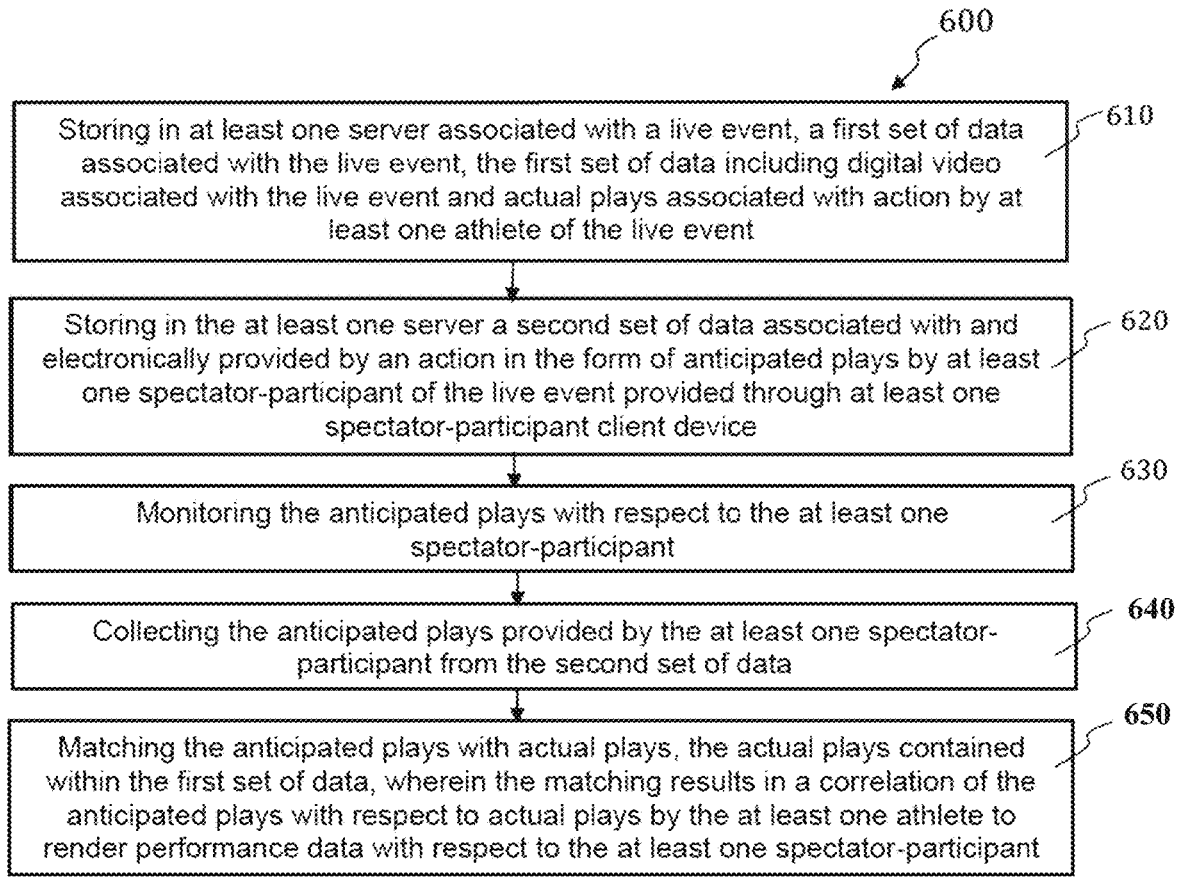
FIG. 6 illustrates a block diagram of steps that can be followed for immersing spectators in a live sporting event and evaluating spectator-participant performance, in accordance with an example embodiment.

FIG. 6 illustrates a block diagram 600 of a method for electronically facilitating the immersion of spectators in a live event. As indicated at block 610, a step or operation can be implemented for storing in at least one server associated with a live event, a first set of data associated with the live event can be stored in at least one server associated with a live event, and the first set of data can include digital video associated with the live event and actual plays associated with action by at least one athlete of the live event. As shown in block 620, a second set of data associated with and electronically provided by an action in the form of anticipated plays by at least one spectator-participant of the live event provided through at least one spectator-participant client device can be stored in the at least one server. Then, as indicated at block 630, the anticipated plays with respect to the at least one spectator-participant can be monitored. As indicated thereafter at block 640, the anticipated plays provided by the at least one spectator-participant can be collected from the second set of data. Next, as depicted at block 650, the anticipated plays can be matched with actual plays, the actual plays contained within the first set of data, wherein the matching results in a correlation of the anticipated plays with respect to actual plays by the at least one athlete to render performance data with respect to the at least one spectator-participant.

Figure 7:
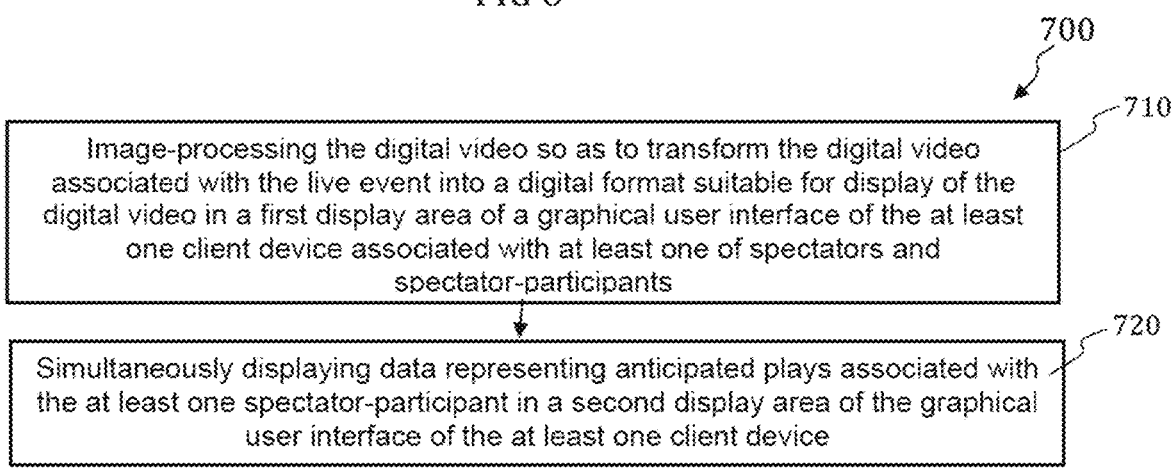
FIG. 7 illustrates a block diagram of steps that can be followed for imaging processing in support of a system for immersing spectators in a live sporting event and evaluating spectator-participant performance, in accordance with an example embodiment.

FIG. 7 illustrates a block diagram 700 of method steps for electronically facilitating the immersion of spectators in a live event including image processing associated with the event. As shown at block 710, at step or operation can be implemented in which the digital video is image-processed so as to transform the digital video associated with the live event into a digital format suitable for display of the digital video in a first display area of a graphical user interface of the at least one client device associated with at least one of spectators and spectator-participants. Then, as indicated at block 720, data representing anticipated plays associated with the at least one spectator-participant is simultaneously displayed in a second display area of the graphical user interface of the at least one client device with data of athletes.

Figure 8:
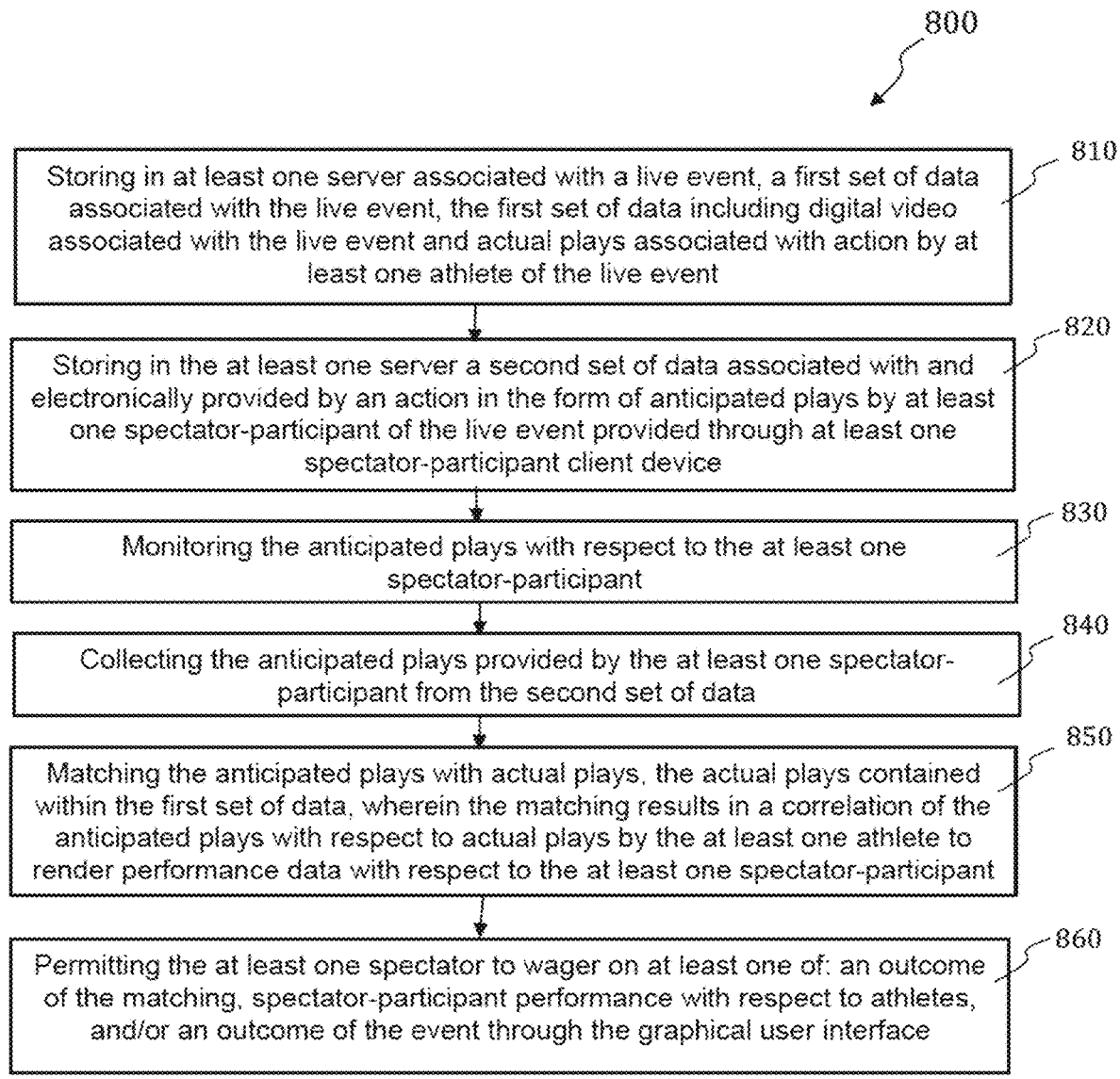
FIG. 8 illustrates a block diagram of steps for immersing spectators in a live sporting event, evaluating spectator-participant performance and supporting wagering on performance of participating spectators, in accordance with an example embodiment.

FIG. 8 illustrates a block diagram 800 of method steps for electronically facilitating the immersion of spectators in a live event. As illustrated at block 810, a step or operation can be implemented wherein a first set of data associated with the live event can be stored in at least one server associated with a live event and the first set of data can include digital video associated with the live event and actual plays associated with action by at least one athlete of the live event. As shown next at block 820, a second set of data associated with and electronically provided by an action in the form of anticipated plays by at least one spectator-participant of the live event provided through at least one spectator-participant client device can be stored in the at least one server.

Then as depicted at block 830, the anticipated plays with respect to the at least one spectator-participant can be monitored. As shown at block 840, the anticipated plays provided by the at least one spectator-participant can be collected from the second set of data. Thereafter, as described at block 850, the anticipated plays can be matched with actual plays, the actual plays contained within the first set of data, wherein the matching results in a correlation of the anticipated plays with respect to actual plays by the at least one athlete to render performance data with respect to the at least one spectator-participant. Then, as depicted at block 860, the at least one spectator can be permitted to wager on at least one of: an outcome of the matching, spectator-participant performance with respect to athletes, and/or an outcome of the event through the graphical user interface.

It should be appreciated that handheld devices can be pre-registered and/or pre-authorized to access the remote server or servers to employ the services taught herein. Registration can require any of user identity, contact/address information, demographics, setting up a username, setting up a password, occupation, areas of interest, payment of a fee, and establishment of an account for wagering. Registered user can then be recognized by a server based on device identification or upon logging into the server.

It should also be appreciated that advertising data (e.g., in the form of text ads or short video commercials) can be provided to handheld devices or other clients utilized by spectators and spectator-participants, either locally at a venue or remotely, for obtaining or engaging with data including video that is of interest (related to the video programming displayed on a flat panel) prior to, or after, receiving the data including video. Advertising data can support a revenue model for a service embodying the features of the present invention so that the service can be provided free of charge to end users rather than collecting user fees.

The claims, description, and drawings of this application may describe one or more of the instant technologies in operational/functional language, for example as a set of operations to be performed by a computer. Such operational/functional description in most instances can be specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein can be a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions are representative of static or sequenced specifications of various hardware elements. This is true because tools available to implement technical disclosures set forth in operational/functional formats-tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. In order to facilitate human comprehension, in many instances, high-level programming languages resemble or even share symbols with natural languages.

It has been argued that because high-level programming languages may use strong abstraction (e.g., that they may resemble or share symbols with natural languages), they are therefore a "purely mental construct." (e.g., that "software"—a computer program or computer-programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages may use strong abstraction to facilitate human understanding should not be taken as an indication that what is expressed is an abstract idea. In an example embodiment, if a high-level programming language is the tool used to implement a technical disclosure in the form of functions/operations, it can be understood that, far from being abstract, imprecise, "fuzzy," or "mental" in any significant semantic sense, such a tool is instead a near incomprehensibly precise sequential specification of specific computational—machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory devices, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors).

The logic circuits forming the microprocessor are arranged to provide a micro-architecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handing, and external Input/Output.

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a sting of zeros and ones, specify many, many constructed physical machines or physical machine states.

Machine language is typically incomprehensible by most humans (e.g., the above example was just ONE instruction, and some personal computers execute more than two billion instructions every second).

Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification, which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. Accordingly, any such operational/functional technical descriptions may be understood as operations made into physical realty by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object, which has a stable, measurable, and changeable state may be used to construct a machine based on the above technical description. Charles Babbage, for example, constructed the first computer out of wood and powered by cranking a handle.

Thus, far from being understood as an abstract idea, it can be recognizes that a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

At least a portion of the devices or processes described herein can be integrated into an information processing system. An information processing system generally includes one or more of a system unit housing, a video display device, memory, such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), or control systems including feedback loops and control motors (e.g., feedback for detecting position or velocity, control motors for moving or adjusting components or quantities). An information processing system can be implemented utilizing suitable commercially available components, such as those typically found in data computing/communication or network computing/communication systems.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes or systems or other technologies described herein can be effected (e.g., hardware, software, firmware, etc., in one or more machines or articles of manufacture), and that the preferred vehicle will vary with the context in which the processes, systems, other technologies, etc., are deployed. For example, if an implementer determines that speed and accuracy are paramount, the implementer may opt for a mainly hardware or firmware vehicle; alternatively, if flexibility is paramount, the implementer may opt for a mainly software implementation that is implemented in one or more machines or articles of manufacture; or, yet again alternatively, the implementer may opt for some combination of hardware, software, firmware, etc. in one or more machines or articles of manufacture. Hence, there are several possible vehicles by which the processes, devices, other technologies, etc., described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. In an embodiment, optical aspects of implementations will typically employ optically-oriented hardware, software, firmware, etc., in one or more machines or articles of manufacture.

The herein described subject matter sometimes illustrates different components contained within, or connected with, different other components. It is to be understood that such depicted architectures are merely examples, and that in fact, many other architectures can be implemented that achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled," to each other to achieve the desired functionality, and any two components capable of being so associated can also be viewed as being "operably coupleable" to each other to achieve the desired functionality. Specific examples of operably coupleable include, but are not limited to, physically mateable, physically interacting components, wirelessly interactable, wirelessly interacting components, logically interacting, logically interactable components, etc.

In an example embodiment, one or more components may be referred to herein as "configured to," "configurable to," "operable/operative to," "adapted/adaptable," "able to," "conformable/conformed to," etc. Such terms (e.g., "configured to") can generally encompass active-state components, or inactive-state components, or standby-state components, unless context requires otherwise.

The foregoing detailed description has set forth various embodiments of the devices or processes via the use of block diagrams, flowcharts, or examples. Insofar as such block diagrams, flowcharts, or examples contain one or more functions or operations, it will be understood by the reader that each function or operation within such block diagrams, flowcharts, or examples can be implemented, individually or collectively, by a wide range of hardware, software, firmware in one or more machines or articles of manufacture, or virtually any combination thereof. Further, the use of "Start," "End," or "Stop" blocks in the block diagrams is not intended to indicate a limitation on the beginning or end of any functions in the diagram. Such flowcharts or diagrams may be incorporated into other flowcharts or diagrams where additional functions are performed before or after the functions shown in the diagrams of this application. In an embodiment, several portions of the subject matter described herein is implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software and or firmware would be well within the skill of one of skill in the art in light of this disclosure. In addition, the mechanisms of the subject matter described herein are capable of being distributed as a program product in a variety of forms, and that an illustrative embodiment of the subject matter described herein applies regardless of the particular type of signal-bearing medium used to actually carry out the distribution. Non-limiting examples of a signal-bearing medium include the following: a recordable type medium such as a floppy disk, a hard disk drive, a Compact Disc (CD), a Digital Video Disk (DVD), a digital tape, a computer memory, etc.; and a transmission type medium such as a digital or an analog communication medium (e.g., a fiber optic cable, a waveguide, a wired communications link, a wireless communication link (e.g., transmitter, receiver, transmission logic, reception logic, etc.), etc.).

While particular aspects of the present subject matter described herein have been shown and described, it will be apparent to the reader that, based upon the teachings herein, changes and modifications can be made without departing from the subject matter described herein and its broader aspects and, therefore, the appended claims are to encompass within their scope al such changes and modifications as are within the true spirit and scope of the subject matter described herein. In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Further, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense of the convention (e.g., "a system having at least one of A, B, or C" would include but not be limited to systems that have A alone, B alone, C alone, A and B together, A and C together, B and C together, and/or A, B, and C together, etc.). Typically a disjunctive word or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, the operations recited therein generally may be performed in any order. Also, although various operational flows are presented in a sequence(s), it should be understood that the various operations may be performed in orders other than those that are illustrated, or may be performed concurrently. Examples of such alternate orderings includes overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

Improvements and modifications can be made to the foregoing without departing from the scope of the present disclosure. It can be appreciated that variations of the above-disclosed and other features and functions, or alternatives thereof, can be desirably combined into many other different systems or applications. It can also be appreciated that various presently unforeseen or unanticipated alternatives, modifications, variations or improvements therein can be subsequently made by those skilled in the art which are also intended to be encompassed by the following claims.

It should be appreciated from the foregoing disclosure that the methods and systems described herein can be utilized in various environments including private offices or living rooms and public venues such as sports bars, casinos, sports stadiums, shopping centers, amusement parks, transportation terminals, educational institutions, and others public and private locations.

The invention claimed is:

1. A method for electronically facilitating the immersion of spectators as competitors with eSports athletes in a live multiplayer computer game occurring as part of an eSports event, the method comprising:
   monitoring a live multiplayer computer game;
   storing in at least one server associated with the live multiplayer computer game and the eSports event, a first set of data including digital video of the live multiplayer computer game and plays associated with action entered on a human-computer interface by at least one eSports athlete participating in the eSports event and the multiplayer computer game;
   storing in the at least one server a second set of data associated with the eSports event and electronically provided by action in the form of spectator-participant plays provided on a human-computer interface associated with a spectator-participant participating in the eSports event, wherein the spectator-participant plays are provided contemporaneously with the plays executed by the at least one eSports athlete and are provided through a human-computer interface included in a client device connected via a data network to the at least one server and associated with the spectator-participant;
   evaluating the first set of data and the second set of data, wherein results of the evaluating include a comparison of the spectator-participant plays with respect to the at least one eSports athlete plays to render performance data with respect to the spectator-participant and the at least one eSports athlete.

2. The method of claim 1, further comprising:
   image-processing the digital video so as to transform the digital video associated with the live multiplayer computer game occurring as part of the eSports event into a digital format suitable for display of the digital video in a first display area of a graphical user interface of the client device associated with the spectator-participant; and simultaneously displaying data representing spectator-participant plays in a second display area of the graphical user interface of client device.

3. The method of claim 1, wherein the spectator-participant is also a spectator of the eSports event when receiving data at the client device and is a spectator-participant in the eSports event when providing data in the form of spectator-participant plays via the human-computer interface included in a client device connected via a data network to the at least one server associated with the eSports event.

4. The method of claim 3, wherein the performance data are utilized to determine rankings for use in at least one of:
 a prize allocation to at least one top performer selected from a pool of spectator-participants; and
 an establishment of a talent pool of spectator-participants for use by recruiters of future professional competitions.

5. The method of claim 3, wherein the digital video is enhanced for VR rendering via the VR device utilized by the at least one eSports athlete and the spectator-participant.

6. The method of claim 1, permitting the at least one spectator to wager on an outcome of the performance data through a mobile device.

7. A system for electronically facilitating the immersion of spectators in an eSports event wherein a primary aspect of the eSports event is scoring user video gaming entries entered into an electronic video gaming system by eSports athletes as plays by competitors in a multiplayer computer game and wherein input by eSports athletes in the eSports event are entered into the electronic video gaming system by human-computer interfaces connected to the electronic video gaming system, the system comprising:
 at least one processor; and
 access to at least one server associated with the eSports event and providing eSports athletes and spectator-participants access to a multiplayer computer game via electronic video gaming systems, the at least one server programmed to communicate with the at least one processor, and provide instructions executable by at least one of the at least one processor and the at least one server for:
 monitoring a live multiplayer computer game;
 storing in the at least one server associated with the eSports event a first set of data associated with the eSports event, the first set of data including digital video of the multiplayer computer game and plays associated with action by at least one eSports athlete participating in the eSports event and the multiplayer computer game and entered on a human-computer interface associated with the at least one eSports athlete;
 storing in the at least one server associated with the eSports event a second set of data associated with the eSports event and electronically provided by action of a spectator-participant taken on a human-computer interface from the spectator-participant while the spectator-participant is contemporaneously participating in the eSports event and the multiplayer computer game with the at least one eSports athlete through a client device connected to the at least one server via a data network and associated with the spectator-participant; and
 evaluating the first set of data and the second set of data, wherein results of the evaluating include a omparison of the spectator-participant plays with respect to plays by the at least one eSports athlete to render data indicative of performance of the spectator-participant with respect to the at least one eSports athlete.

8. The system of claim 7, wherein the instructions are further configured for:
 image-processing the digital video so as to transform the digital video associated with the eSports event into a digital format suitable for display of the digital video in a first display area of a graphical user interface of at least one electronic video gaming system; and
 simultaneously displaying data associated with the spectator-participant in a second display area of the graphical user interface of the at least one electronic video gaming system as the spectator-participant is competing in a multiplayer computer game with at least one eSports athlete by contemporaneously entering commands with the at least one eSports athlete on the human-computer interface.

9. The system of claim 7, wherein the instructions are further configured for storing results of the comparing in at least one database associated with the at least one server.

10. The system of claim 7, wherein:
 the evaluating further includes digital streaming of results of the comparison of the first set of data and the second set of data to at least one client device receiving data associated with the eSports event.

11. A system for electronically facilitating the immersion of spectators in an eSports event wherein the eSports event comprises operation of a multiplayer electronic computer game wherein a primary aspect of the computer game is an analysis of user gaming entries entered onto a human-computer interfaces of a computer gaming system, the system comprising:
 at least one processor; and
 a non-transitory computer-usable medium embodying computer program code, the computer-usable medium capable of communicating with the at least one processor, the computer program code comprising instructions executable by the at least one processor and configured for:
 monitoring a live multiplayer computer game;
 storing in at least one server associated with the eSports event a first set of data associated with the eSports event, the first set of data including digital video and plays associated with at least one eSports athlete of the eSports event, wherein the plays associated with the at least one eSports athlete are provided by the at least one eSports athlete through at least one human-computer interface associated with the at least one eSports athlete;
 storing in the at least one server a second set of data associated with and electronically provided by action of a spectator-participant of the eSports event entered as plays of the spectator-participant into the system contemporaneously with the plays of the at least one eSports athlete, wherein the plays of the spectator-participant are provided by the spectator-participant through at least one human-computer interface associated with the spectator-participant; and
 evaluating the first set of data and the second set of data, wherein results of the evaluating include a comparison of the plays of the spectator-participant with respect to the plays associated with the at least one eSports athlete to render data indicative of performance rankings of the spectator-participant of the eSports event with respect to a performance of the at least one eSports athlete.

12. The system of claim 11, wherein the instructions are further configured for:
   image-processing the digital video so as to transform the digital video associated with the eSports event into a digital format suitable for display of the digital video in a first display area of a graphical user interface of at least one electronic video gaming system; and
   simultaneously displaying data associated with the at least one spectator-participant in a second display area of the graphical user interface of the at least one electronic video gaming system as the at least one spectator-participant is competing in the multiplayer computer game with at least one eSports athlete by contemporaneously entering commands with the at least one eSports athlete on the at least one respective human-computer interface.

13. The system of claim 11, wherein the instructions are further configured for storing results of the multiplayer computer game in at least one database associated with the at least one server.

14. The system of claim 11, wherein the instructions configured for evaluating further includes intstructions further configured for digital streaming of results of the comparison of the first set of data and the second set of data to at least one client device receiving data associated with the eSports event.

15. The system of claim 11, wherein the instructions are further configured for permitting at least one spectator to wager on an outcome of the performance through a mobile device.

\* \* \* \* \*